US011858051B2

(12) United States Patent
Hudson

(10) Patent No.: US 11,858,051 B2
(45) Date of Patent: Jan. 2, 2024

(54) PASSIVE LOCKING CHUCK FOR ROTARY DRIVER

(71) Applicant: Ojjo, Inc., San Rafael, CA (US)

(72) Inventor: Tyrus Hudson, Petaluma, CA (US)

(73) Assignee: Ojjo, Inc., San Rafael, CA (US)

(*) Notice: Subject to any disclaimer, the term of this patent is extended or adjusted under 35 U.S.C. 154(b) by 43 days.

(21) Appl. No.: 17/194,142

(22) Filed: Mar. 5, 2021

(65) Prior Publication Data

US 2021/0276173 A1 Sep. 9, 2021

Related U.S. Application Data

(60) Provisional application No. 62/985,790, filed on Mar. 5, 2020.

(51) Int. Cl.
| | |
|---|---|
| *B23B 31/113* | (2006.01) |
| *B25D 17/08* | (2006.01) |
| *B23B 31/00* | (2006.01) |

(52) U.S. Cl.
CPC ........... *B23B 31/113* (2013.01); *B23B 31/008* (2013.01); *B23B 2240/04* (2013.01); *B25D 17/084* (2013.01); *B25D 2217/0042* (2013.01); *Y10T 279/17888* (2015.01); *Y10T 279/32* (2015.01)

(58) Field of Classification Search
CPC ................ B25D 17/088; B25D 17/084; B25D 2217/003; B23B 31/113; B23B 2231/52; B23B 2231/46; B23B 2240/04; Y10T 279/32; Y10T 279/17888; B25G 3/16; E21B 17/046

See application file for complete search history.

(56) References Cited

U.S. PATENT DOCUMENTS

| | | | |
|---|---|---|---|
| 6,176,655 B1 * | 1/2001 | Ostermeier | ........... B23B 31/113 |
| | | | 408/239 R |
| 2018/0229310 A1 * | 8/2018 | Miura | ................. B23B 31/2072 |

FOREIGN PATENT DOCUMENTS

CN    209620011 U  * 11/2019

OTHER PUBLICATIONS

Machine Translation of CN 209620011 (Year: 2019).*

* cited by examiner

*Primary Examiner* — Sunil K Singh
*Assistant Examiner* — Joshua S Hearne
(74) *Attorney, Agent, or Firm* — Phillip D. Mancini

(57) ABSTRACT

A passive locking chuck for a rotary driver. The chuck has a pair of rings, one fixed and the other rotatable between a first orientation where recesses formed in the rotatable ring are aligned with recesses formed in the fixed ring, and a second orientation where the recesses are offset from one another. When an upper end of a foundation component having a toothed coupler is inserted into the chuck and rotated axially, the movable ring is moved to the second orientation and the foundation component is thereby captured in the chuck. As soon as resistance is encountered from the soil, the ring moves back to the first orientation so that upon reaching the desired embedment depth, the rotary driver may be withdrawn without counter rotation.

11 Claims, 6 Drawing Sheets

PASSIVE LOCKING CHUCK FOR ROTARY DRIVER

CROSS-REFERENCE TO RELATED APPLICATIONS

This claims priority to U.S. provisional patent application No. 62/985,790 filed on Mar. 5, 2020, titled "PASSIVE LOCKING CHUCK FOR ROTARY DRIVER", the disclosure of which is hereby incorporated by reference in its entirety.

BACKGROUND

The applicant of this disclosure has developed a new foundation system for single-axis trackers, fixed tilt arrays and other structures. Known commercially as EARTH TRUSS, the system consists of a pair of adjacent, angled tubular steel legs that extend below ground and that are joined at their apex with an adapter, truss cap or bearing adapter to form a structural truss with the ground. Unlike traditional monopile tracker foundations made with conventional wide-flange steel beams, the EARTH TRUSS is able to convert lateral loads from wind striking the tracker array into axial forces of tension and compression in the truss legs. Individual structural members are relative good at resisting axial loads. By contrast, in a monopile foundation, these loads impart a bending moment. As a result, the EARTH TRUSS foundation is able to support the same tracker with less steel and shallower sub-terrain embedment depths relative to monopile foundations.

The base component of the EARTH TRUSS foundation system is the screw anchor, shown for example, in FIG. 1. The foundation is constructed by driving a pair of adjacent screw anchors into the ground on either side of an intended North-South tracker row. The apex hardware (e.g., adapter, truss cap, or bearing adapter) is held in place at the correct orientation and upper leg sections are sleeved over connecting portions on the apex hardware and on the upper end of each screw anchor to complete each truss. As shown in FIG. 1, screw anchor 10 is an elongated section of open, steel pipe 11 with external thread form 12 at the lower end and driving coupler 13 at the upper end. Thread form 12 keeps the anchor on path while it is driven, which is particularly important when driving from the upper end. If the anchor is properly driven to avoid augering the ground, the thread form substantially increases the anchor's bearing capacity and resistance to pull-out which, is required when supporting solar arrays and various other structures.

In order to drive a screw anchor such as anchor 10 shown in FIG. 1 into supporting ground, coupler 13 at the upper end is inserted into the chuck of a rotary driver of a screw anchor driving machine. The machine may be a piece of general-purpose equipment (e.g., skid-steer, excavator, tractor, etc.) or purpose-built machine such as the so-called truss driver machine shown for example in commonly assigned U.S. patent application Ser. No. 16/416,052, the disclosure of which is hereby incorporated by reference in its entirety.

To drive anchor 10 shown, the chuck of the rotary driver must have a series of reciprocal indents that receive driving features 14 circumscribing coupler 13; the rotary driver transfers torque to anchor 10 by pressing against features 14 while applying downforces to surfaces 14A. Once anchor 10 begins penetrating the ground, resistance keeps it pressed into the chuck so that the anchor and chuck remain pressed together. However, prior to encountering that resistance, the anchor may fall out of the chuck under the force of gravity as the orientation of the rotary driver and/or machine is adjusted. To prevent this from happening, conventional rotary driver may use set screws, pins, or other locking features to hold the foundation component to the chuck until the anchor is driven. Once the desired depth is reached, the screw, pin or other locking fastener must be removed so that the driver can be withdrawn, leaving the driven component embedded in the ground. This additional step of locking and unlocking the anchor may be acceptable when only a few screw anchors need to be driven but in so-called utility-scale solar arrays, where many thousands or even tens of thousands of screw anchors must be driven across a multi-acre array site, additional process steps may not be acceptable. Also, if the operator forgets to disengage the chuck from the component, retraction of the rotary driver may pull out or weaken the component as the rotary driver is withdrawn, requiring a time-consuming and expensive mitigation process.

In recognition of this these problems, various embodiments of the invention are directed to a passive locking chuck for a rotary driver of a screw anchor driving machine that is able to hold a screw anchor securely without letting it fall out while the rotary driver is moved, but that does not require additional manual steps to decouple the chuck from the anchor before withdrawing the driver.

DETAILED DESCRIPTION

Figure 1:
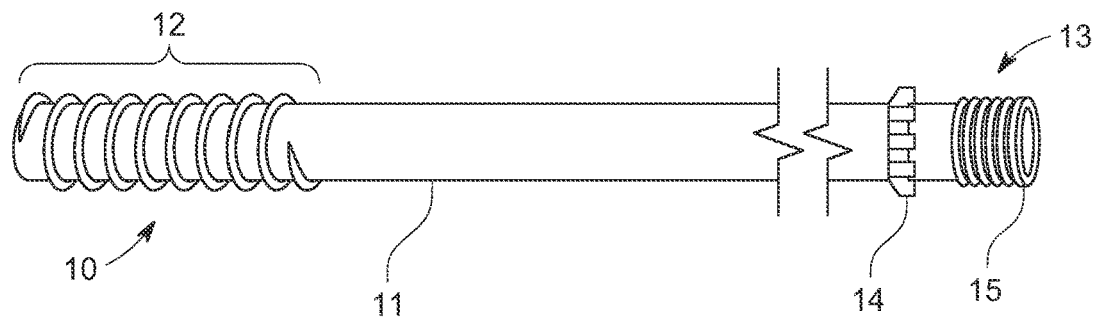
FIG. 1 shows an EARTH TRUSS screw anchor usable with various embodiments of the invention.

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Turning now to the drawing figures, FIGS. 2A through 2D show different views of a passive locking chuck for a rotary screw anchor driver according to various embodiments of the invention. For ease of illustration, the machine supporting the rotary driver has been intentionally omitted from this disclosure. As seen in the aforementioned co-pending patent application Ser. No. 16/416,052, such a machine may have an articulating mast supporting a rotary driver on a carriage that is operable to move along the mast to driver screw anchors into the ground along specific driving axes. The mast may also support a drilling tool, such as a hydraulic drifter, that actuates a drill rod along the same axes, through the rotary driver and the screw anchor, to assist with screw anchor embedment.

Figure 2A:
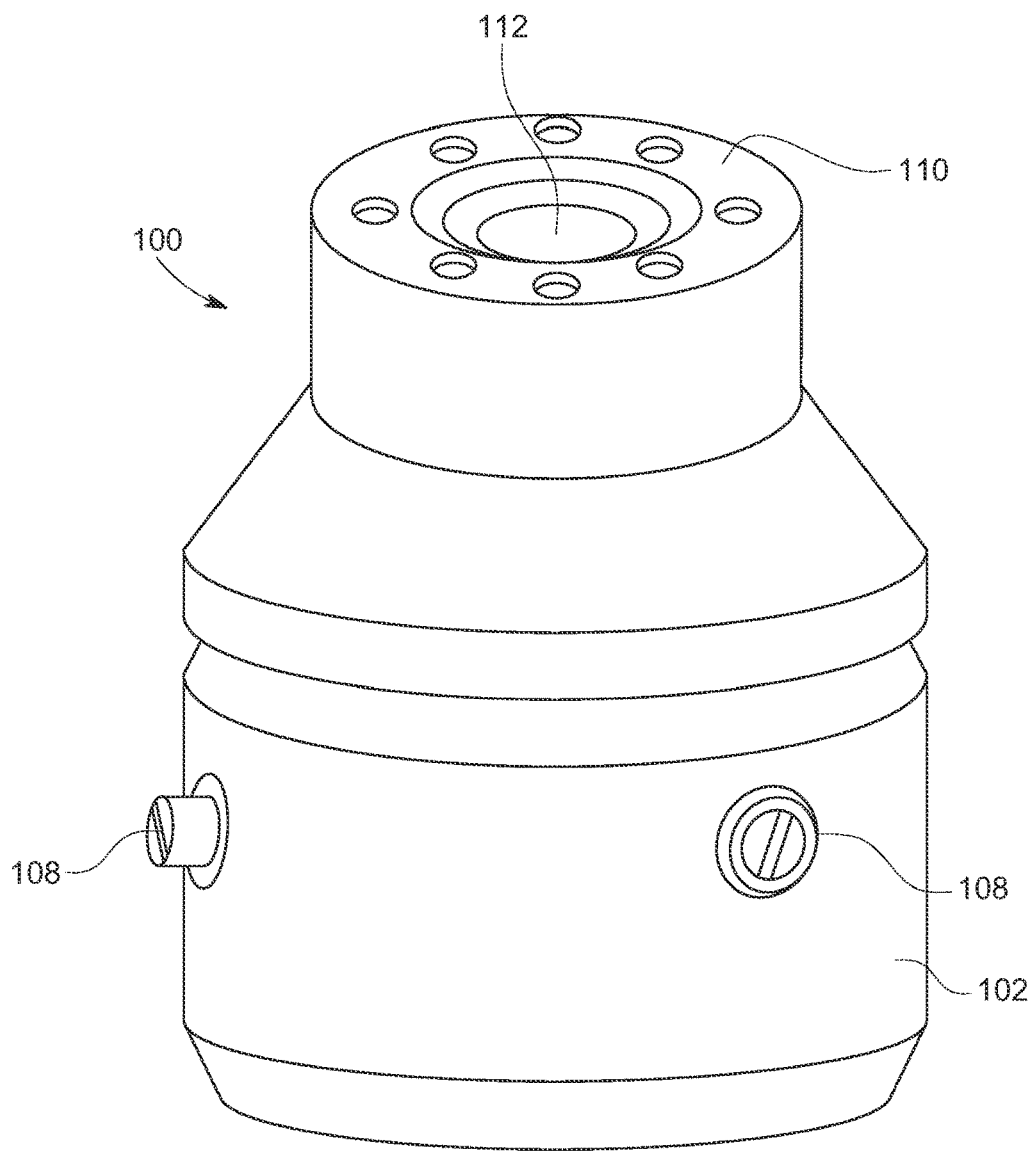
FIG. 2A shows an upper view of a passive locking chuck for a rotary driver according to various embodiments of the invention.
Figure 2B:
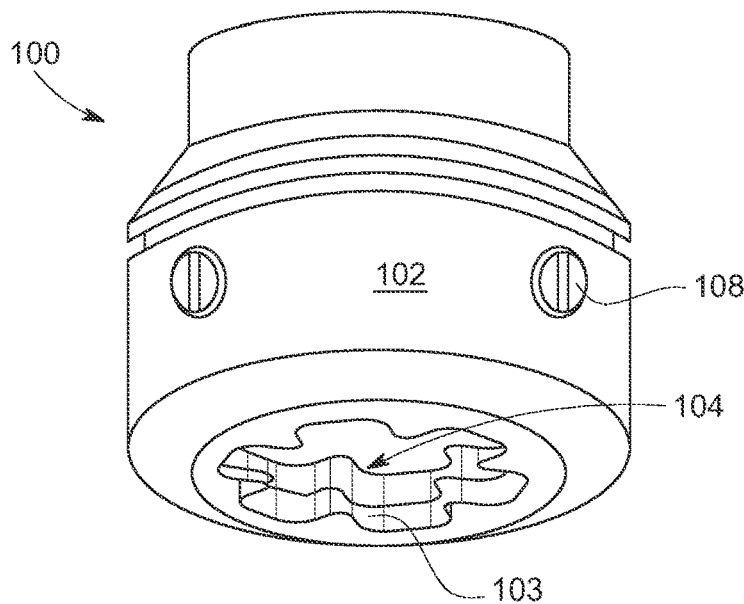
FIG. 2B shows a bottom perspective view of the passive locking chuck for a rotary driver according to various embodiments of the invention.

With continued reference to the figures, chuck 100 has an upper end with mounting surface 110 which, as shown, may include several threaded openings to receive bolts that attach the chuck to the rotating output of the rotary driver. Opening 112 extends all the way through main body 102, providing a channel through the body that gives clearance for the drill rod to pass through. The lower end of chuck 100 has a fixed, open ring 103, visible for example in 2B, that receives driving coupler 13 of a foundation component such as screw anchor 10. As seen in FIG. 2B, fixed ring 103 is has a series of recesses that extend up into opening 112 that are evenly distributed around the inner surface of the ring. These recesses may extend a couple of inches into main body 102 of the chuck. These recesses terminate at a top portion of movable inner ring 104 concealed within main body 102, directly above fixed ring 103. Movable inner ring 104 has the same pattern of recesses on its inner surface, but unlike fixed ring 103, provides an upper surface that limits the depth of penetration of coupler 13 into the chuck. When the respective recesses in movable inner ring 104 are aligned with the ones built into fixed ring 103, driving coupler 13 of the foundation component 10 can be inserted all the way in until the teeth or other driving features 14 contact the top surface of movable inner ring 104.

As shown in FIGS. 2A-2D, a series of threaded ball detents 108 are distributed around body 102 of chuck 100 and extend through the body until they contact reciprocal surfaces formed in the outer surface of movable ring 104 to hold it at either, (1) the first angular orientation, where the recesses in the ring are aligned with the recesses in the opening, or (2) the second angular orientation, where the recesses in inner ring 104 are offset from the recesses in fixed outer ring 103. In various embodiments, 10 to 20-degrees of angular displacement may separate the first orientation from the second orientation.

The outer surface of movable inner ring 104 has a series of rounded projections 105 separated by circular surfaces of smaller diameter. In the drawings, three ball detents 108 sit at the end of threaded posts and are screwed into main body 102 of the chuck until the spring-loaded balls contact inner movable ring 104. It should be appreciated that more or fewer than three may be used. In various embodiments, small half or partial-spherical recesses such as recesses 109 shown in FIG. 2D may be formed on inner ring 104's outer surface to receive and capture ball detents 108 at the first orientation and at the second orientation and to hold it into place until it is acted on by a twisting force such as the resistance to rotation from the ground or a human operator loading a screw anchor and twisting it to reposition the inner ring.

Figure 2C:
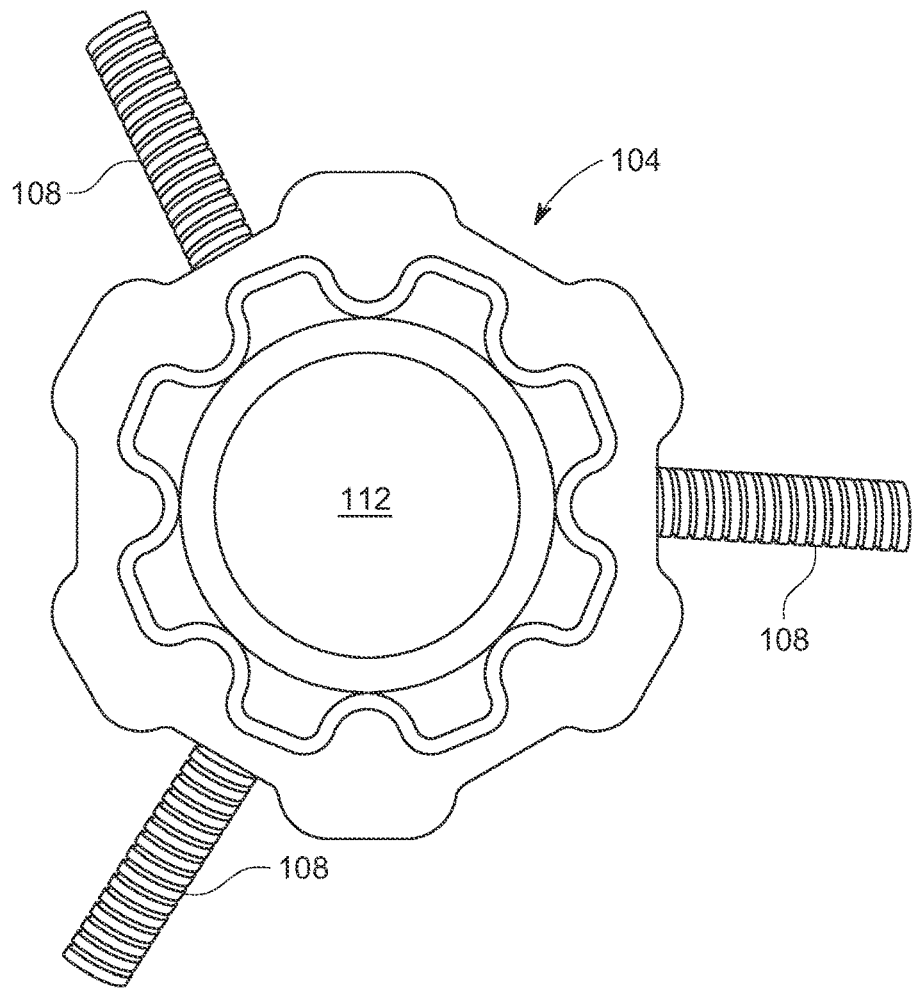
FIGS. 2C and 2D are bottom views of portions of the passive locking chuck according to various embodiments of the invention.

FIG. 2C shows a bottom view of movable inner ring 103 with the chuck removed for clarity. The outer surface of ring 103 is generally circular with evenly spaced portions removed to narrow the outer diameter. Removal at these areas leaves six sections of reduced diameter and six corresponding sections of relatively greater diameter. Although if milled, this is typically done in a destructive process, the portions of larger diameter may be thought of as projections. In various embodiments, ball detents 108 will engage portions of the outer surface of inner ring 104 that have relatively narrower diameter. In various embodiments, partial spherical indents 109 are formed in the outer surface so that that detents will "lock" the ring in place as it rotated from one orientation to the other. They may be unlocked when a twisting force is applied to the screw anchor but will not unlock merely from the weight of the anchor or motion of the rotary driver in air as the machine mast is oriented to the correct driving axis.

Figure 2D:
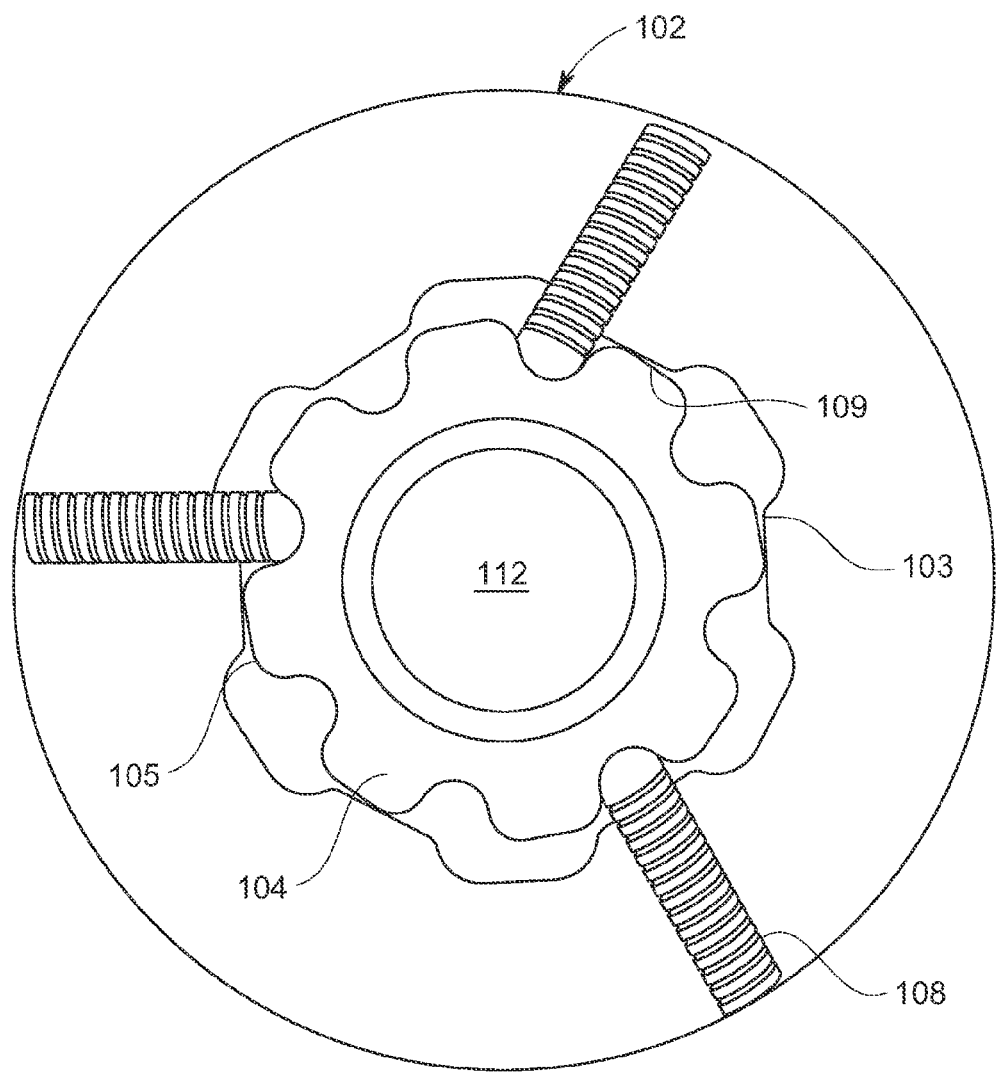

FIG. 2D is a partial cut away view from the topside with a portion of the chuck removed to reveal the geometries of the inner surface of fixed ring 103 and outer surface of movable inner ring 104. The fixed ring 103 recesses formed in it that receive the portions of relatively larger diameter on movable ring 104. The relatively narrower diameter sections on the inner surface of fixed ring 103 function as stops for movable ring 104, limiting the extent of its angular movement. In various embodiments, this may be limited to approximately 10-20-degrees, and preferably to the extent that maximizes the misalignment between the recesses in the chuck and the recesses in the ring, a shown, for example, in FIG. 4B. The particular number of teeth in the screw anchor and corresponding recesses in fixed ring 103 and movable ring 104 are design choices and are not intended to limit the various embodiments of the disclosure.

Figure 3A:
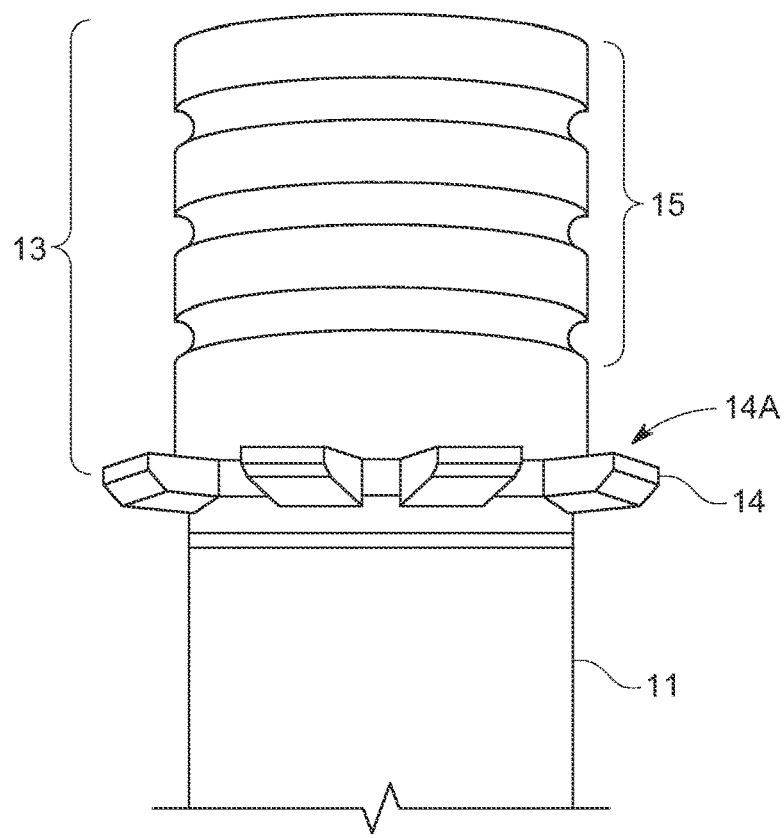
FIG. 3A is a close-up view of a driving coupler for a screw anchor foundation component according to various embodiments of the invention.
Figure 3B:
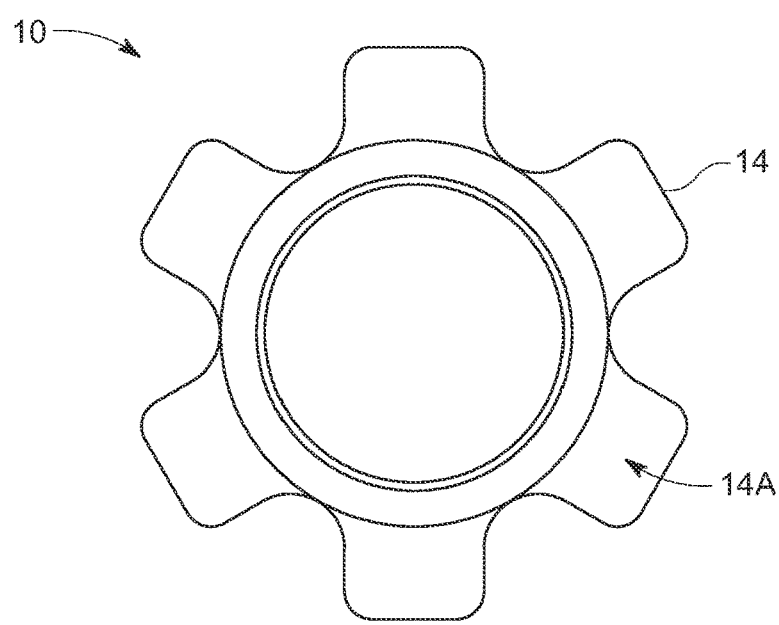
FIG. 3B is a top view of the driving coupler shown in 3A.

FIGS. 3A and B show the upper end of exemplary screw anchor 10 of FIG. 1, including driving coupler 13, in greater detail; FIG. 3A is a perspective view while 3B is a top view looking down. In various embodiments, driving coupler 13 is a single casting that is welded or otherwise attached to the upper end of tube 11 to make screw anchor 10. In various embodiments, coupler 13 has a recess at its lower end that receives the upper end of tube 11 to make screw anchor 10. A series of driving features 14, shown as teeth in the figures, are distributed evenly around the perimeter of the coupler 13. Those teeth fit into corresponding recesses cut into fixed ring 103 and movable inner ring 104 until they top out against narrower top surface of inner ring 104 when the coupler end of screw anchor 10 is inserted into fixed open ring 103 in the chuck. Connecting portion 15 of coupler 13 extends further into channel 112 through the center of main body 102. In various embodiments, connecting portion 15 may have a curved profile and include a series of channels circumscribing its surface to provide voids for a section of tubular steel making up the upper portion of the truss leg to be deformed into when a crimping operation is performed at the overlapping portion of the upper leg.

Figure 4A:
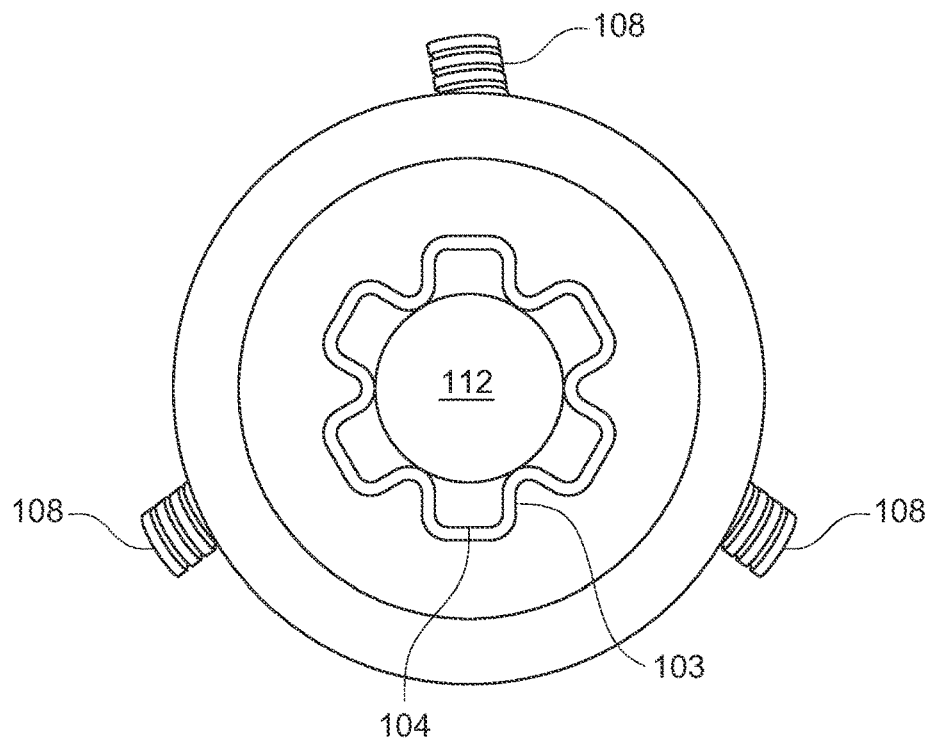
FIG. 4A is a bottom view of the passive locking chuck with inner and outer rings aligned for loading according to various embodiments of the invention.
Figure 4B:
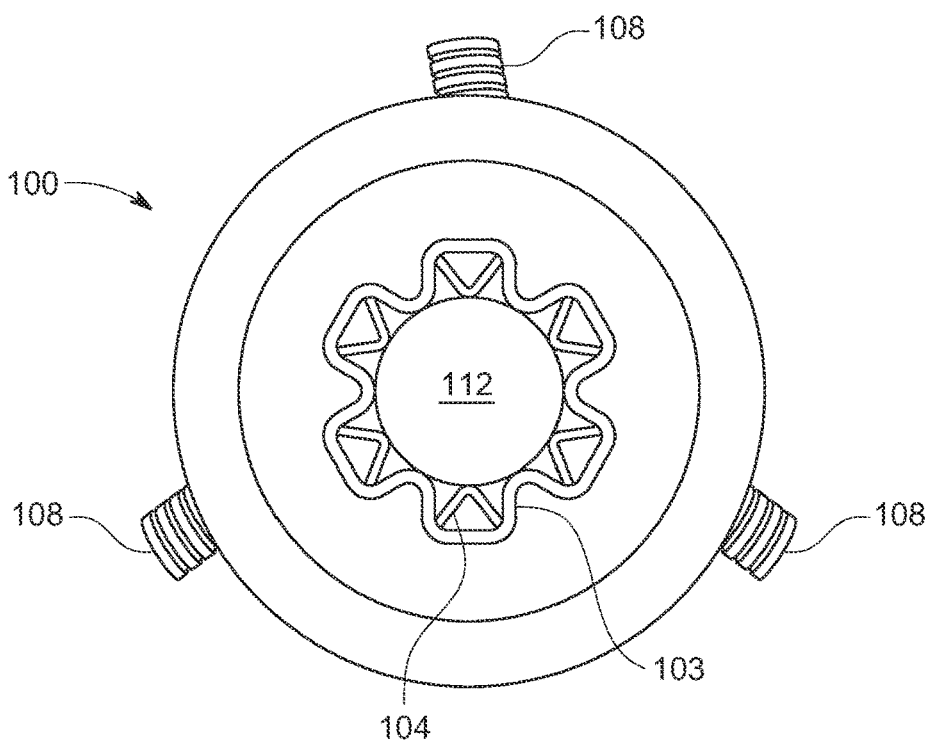
FIG. 4B is a bottom view of the passive locking chuck with inner and outer rings offset for driving according to various embodiments of the invention.

Turning to FIGS. 4A and 4B, these figures show two views looking into the chuck on the bottom side; in 4A respective recesses formed in the movable ring 104 and fixed ring 103 are aligned, whereas in 4B these recesses are offset. As discussed herein, aligning the respective recesses allows the coupler at the driving end of a foundation component, such as screw anchor 10 shown in FIG. 1, to be inserted into the. Once coupler 13 tops out against the top of inner ring 104, that is, when surface 14A hits the top of movable inner ring 104, the operator twists the screw anchor to move inner ring 104 from the first angular orientation to the second orientation (i.e., 10 to 20-degrees difference), thereby "locking" the anchor in the chuck to prevent it from falling out under the force of gravity before driving begins. Connecting portion 15 of coupler 13 preferably fits up into the narrower channel 112 in the center of the chuck and does not receive any forces from the rotary driver during operation of the rotary driving other than incidental contact from the drill rod. FIG. 4B shows the same view as 4A, looking into the bottom of chuck 100 after inner ring 104 has been rotated to the second orientation. For ease of illustration, the screw anchor itself has been omitted from the figure so that the offset between the recesses of fixed ring 103 and movable ring 104 inside the chuck may be clearly seen. At this orientation, the space between recesses formed in the chuck, which act as projections, bear against the bottom surface of the teeth (e.g., surface opposing surface 14A), preventing it from sliding out of the chuck. As discussed herein, when the anchor is acted on by a twisting force, such as when it begins penetrating the soil and encounters resistance to rotation, inner ring 104 will be forced back to the aligned position so that the anchor and chuck are no longer "locked" together. As a result, when driving is complete, the rotary driver, and by extension, passive locking chuck 100, may be pulled straight up (i.e., opposite to the axis of the driven screw anchor) without disturbing its embedment.

Figure 5:
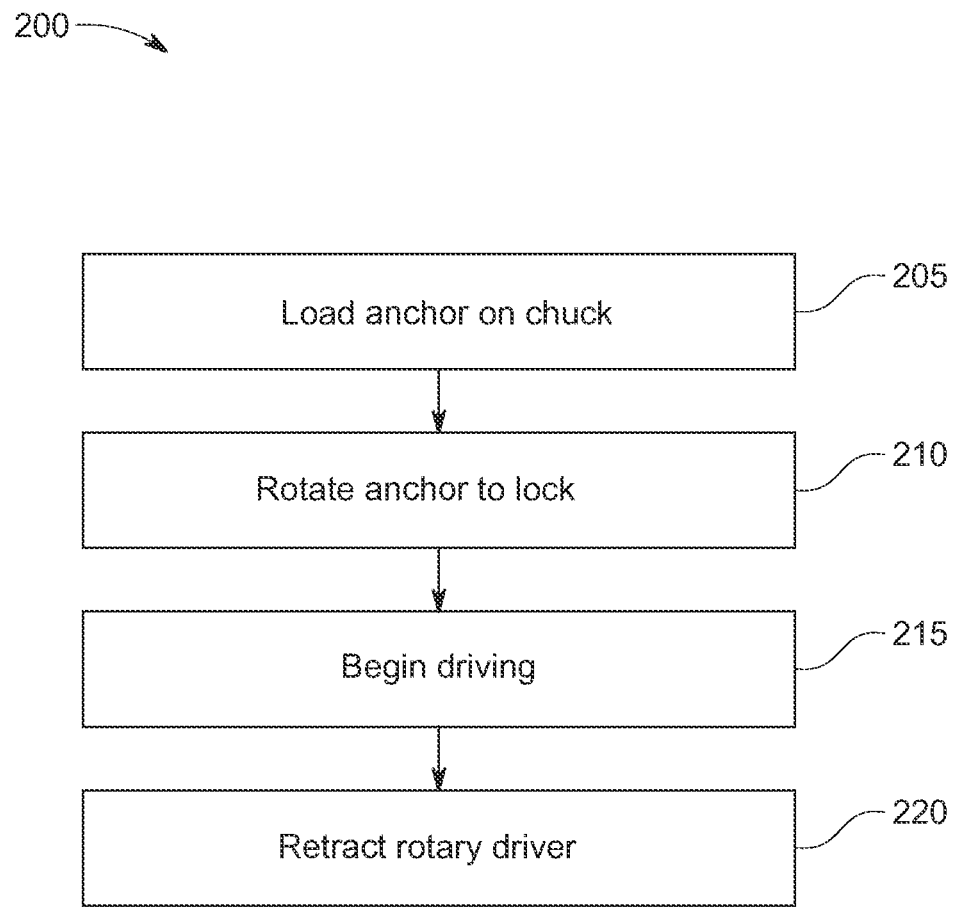
FIG. 5 is a flow chart detailing the steps of loading and driving a screw anchor with the passive locking chuck according to various embodiments of the invention.

FIG. 5 is a flow chart detailing the steps of exemplary method 200 for driving a screw anchor with the passive locking chuck attached to a rotary driver according to various embodiments of the invention. Method 200 begins at step 205 where a screw anchor or other elongated foundation component is loaded into the chuck. As discussed herein, this may consist of inserting the upper, driving end of the screw anchor into the open chuck so that the teeth or other driving features circumscribing the driving coupler are received into the chuck until they top out against the movable inner ring captured within the chuck. Then, at step 210, the operator twists the anchor about is axis so that the movable inner ring moves from the first orientation where it is aligned with the fixed ring built into the chuck, to the second orientation where it is offset from the fixed ring, thereby "locking" the driving coupler, and by extension the screw anchor or other foundation component into the chuck.

The driving operation begins at step 215 where the machine rotary driver is actuated to commence the driving operation. As discussed in the previously mentioned application Ser. No. 16/416,052, this may involve the machine's automated control system applying a combination of torque and downforce to the head of the foundation component via contact between the rotary driver's chuck and the driving coupler to drive it into the ground until it reaches the desired embedment depth. As described herein, when the lower end of the foundation component or screw anchor hits the ground and encounters rotational resistance, the movable ring will revert back to the first orientation, aligning the recesses in the ring with those in the chuck and continuing thereafter to apply the fully rotational force to the teeth on the head of the anchor, leaving the screw anchor pressed against and engaged with but unlocked from the chuck. Torque and downforce continue to be applied until the component reaches the target embedment depth. Once the target depth is reached, because the chuck and screw anchor are mechanically unlocked, at step 220, the rotary driver is retracted by pulling it straight up the driving axis, that is the opposite direction it traveled to embed the screw anchor, without requiring any counterrotation or other manual decoupling, and without pulling up or otherwise disturbing the driven screw anchor.

Alternatively, if the driver encounters a refusal that cannot be mitigated in-situ, the operator may merely reverse the direction of rotation causing the movable inner ring to rotate to the locked position once again so that counterrotation along with upward pressure will uninstall the anchor causing it counterrotate out of the ground. Once it has cleared the ground, an operator may simply twist it back in the opposite direction to remove it or simply allow it to fall from the chuck under the force of gravity.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A chuck for a rotary driver comprising:
   a main body;
   an opening on a bottom portion of the main body, the opening having a first plurality of recesses formed therein to receive a driving end of a foundation component; and
   a movable ring in the opening, the ring having a second plurality of recesses formed on an inner surface thereof and rotatable within the main body from a first angular orientation where the second plurality of recesses aligns with the first plurality of recesses and a second angular orientation where the second plurality of recesses are offset from the first plurality of recesses, wherein the chuck is loaded by inserting a driving end of the foundation component into opening until it contacts the movable ring and twisting the foundation component in a first direction to move the ring from the first orientation to the second orientation and, further wherein, rotating the chuck in the first direction moves the movable ring back to the first orientation when the foundation component encounters resistance to the chuck's rotation.

2. The chuck according to claim 1, further comprising a mounting surface on a top portion of the main body for attachment to an output of a rotary driver, opposite the lower surface.

3. The chuck according to claim 1, wherein projections on an outer surface of the movable ring engages features on an inner surface of the chuck to limit angular movement of the ring within the opening to a range of 10-20 degrees.

4. The chuck according to claim 1, further comprising a plurality of ball detents extending through the main body and contacting rounded projections in an outer surface of the movable ring when the movable ring is moved between the first and second orientation.

5. The chuck according to claim 1, wherein the foundation component comprises an elongated screw anchor.

6. The chuck according to claim 5, wherein the driving end comprises a driving coupler.

7. A passive locking chuck for a rotary driver comprising:
   a main body having an upper portion and a lower portion;
   an opening in the lower portion, the opening having a first plurality of recesses formed on an inner surface thereof; and a movable ring, contained within main body, above the opening, the movable ring having a second plurality of recesses and operable to rotate within the main body from a first orientation where the second plurality of recesses are aligned with the first plurality of recesses to a second orientation where the second plurality of recesses are offset from the first plurality of recesses, wherein the chuck is loaded by inserting a driving end of the foundation component into opening until it contacts the movable ring and twisting the foundation component in a first direction to move the ring from the first orientation to the second orientation and, further wherein, rotating the chuck in the first direction moves the movable ring back to the first orientation when the foundation component encounters resistance to the chuck's rotation.

8. The passive locking chuck according to claim 7, wherein at the first orientation, a toothed driving coupler of a foundation component may be inserted into the opening until the teeth rest against an upper portion of the ring, and through rotation of the foundation component, the ring is movable to the second orientation to capture the foundation component within the chuck.

9. The passive locking chuck according to claim 8, wherein the foundation component comprises a screw anchor.

10. The passive locking chuck according to claim 7, further comprising a plurality of ball detents extending through the main body and received within recesses formed in an outer surface of the movable ring when the ring is at the first and second orientations.

11. The passive locking chuck according to claim 7, further comprising a mounting surface formed in an upper portion of the main body for attaching the chuck to an output of a rotary driver.

\* \* \* \* \*